(12) United States Patent
Katsuta et al.

(10) Patent No.: US 9,921,681 B2
(45) Date of Patent: Mar. 20, 2018

(54) DISPLAY DEVICE

(71) Applicant: Japan Display Inc., Minato-ku (JP)

(72) Inventors: Tadayoshi Katsuta, Tokyo (JP); Hiroshi Mizuhashi, Tokyo (JP); Daisuke Ito, Tokyo (JP); Takafumi Suzuki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/172,266

(22) Filed: Jun. 3, 2016

(65) Prior Publication Data

US 2016/0370930 A1    Dec. 22, 2016

(30) Foreign Application Priority Data

Jun. 19, 2015  (JP) ................. 2015-124090

(51) Int. Cl.
*G06F 3/041*  (2006.01)
*G06F 3/044*  (2006.01)

(52) U.S. Cl.
CPC ............ *G06F 3/0416* (2013.01); *G06F 3/044* (2013.01); *G06F 3/0412* (2013.01); *G06F 2203/04101* (2013.01)

(58) Field of Classification Search
None
See application file for complete search history.

(56) References Cited

U.S. PATENT DOCUMENTS

2012/0262387 A1* 10/2012 Mizuhashi ............ G06F 3/044
                                                                      345/173
2014/0210779 A1    7/2014 Katsuta et al.

FOREIGN PATENT DOCUMENTS

JP         2014-160458         9/2014

* cited by examiner

*Primary Examiner* — Christopher Kohlman
(74) *Attorney, Agent, or Firm* — Oblon, McClelland, Maier & Neustadt, L.L.P.

(57) ABSTRACT

A display device includes a plurality of pixel electrodes, a plurality of drive electrodes and a touch detection electrode. A display function layer is controlled by a voltage generated between the plurality of pixel electrodes and the plurality of drive electrodes in a display period, and touch detection is performed by detecting a voltage of the touch detection electrode in a touch detection period. In the display period, the plurality of drive electrodes are connected to a first wiring, and in the touch detection period, selected drive electrodes of the plurality of drive electrodes are connected to the first wiring, and the other non-selected drive electrodes of the plurality of drive electrodes are connected to a second wiring.

10 Claims, 11 Drawing Sheets

DISPLAY DEVICE

CROSS-REFERENCE TO RELATED APPLICATION

The present application claims priority from Japanese Patent Application No. 2015-124090 filed on Jun. 19, 2015, the content of which is hereby incorporated by reference into this application.

TECHNICAL FIELD OF THE INVENTION

The present invention relates to a display device capable of detecting an external proximity object, specifically, a display device with a touch detection function capable of detecting an external proximity object approaching from outside based on a change in electrostatic capacitance.

BACKGROUND OF THE INVENTION

In recent years, a touch detection device capable of detecting an external proximity object referred to as a so-called touch panel has attracted attention. The touch panel has been used as a display device with a touch detection function which is mounted on or integrated with a display device such as a liquid crystal display device. In this display device with a touch detection function, various button images or the like are displayed on the display device, and the information can be input by the touch panel instead of normal mechanical buttons. Since such a display device with a touch detection function having a touch panel does not need to have an input device such as a keyboard, a mouse or a keypad, its use tends to increase with the inclusion of mobile information terminals such as mobile phones in addition to computers.

As a type of a touch detection device, some types such as an optical type, a resistance type and an electrostatic capacitance type have been known. Among these types, an electrostatic capacitance type touch detection device has a relatively simple structure and consumes less power and so is used for mobile information terminals and the like. For example, Japanese Patent Application Laid-Open Publication No. 2014-160458 (Patent Document 1) describes an electrostatic capacitance type touch panel.

SUMMARY OF THE INVENTION

In the above-described display device with a touch detection function, the display function and the touch detection function are integrated. Therefore, it is known that the drive electrodes for display serve also as the drive electrodes for touch detection. In such a case, it is necessary that two types of wiring, that is, the touch detection drive signal wiring for supplying the touch detection drive signal to the drive electrodes and the display drive voltage wiring for supplying the display drive voltage to the drive electrodes are laid in the frame region of the panel.

In this case, the touch detection drive signal wiring requires low resistance for fast touch drive, and the display drive voltage wiring requires low resistance for display quality retention. Therefore, there is a need to increase the wiring width of each of the touch detection drive signal wiring and the display drive voltage wiring, and this has become a hindering factor against the reduction of frame area. It is true that the display device with a touch detection function described in the Patent Document 1 mentioned above is a technology capable of achieving the reduction of frame area, but no consideration is given to achieving both of the fast touch drive and the display quality retention.

An object of the present invention is to provide a display device that can contribute to the reduction of frame area while achieving both of the fast touch drive and the display quality retention.

A display device according to one aspect of the present invention includes: a plurality of pixel electrodes; a plurality of drive electrodes; and a touch detection electrode, a display function layer is controlled by a voltage generated between the plurality of pixel electrodes and the plurality of drive electrodes in a first period, and touch detection is performed by detecting a voltage of the touch detection electrode in a second period. In the first period, the plurality of drive electrodes are connected to a first wiring, and in the second period, apart of the plurality of drive electrodes are connected to the first wiring, and another part of the plurality of drive electrodes are connected to a second wiring.

As another aspect, a display device includes: a first pixel electrode; a first drive electrode disposed opposite to the first pixel electrode; a second pixel electrode; a second drive electrode disposed opposite to the second pixel electrode; a touch detection electrode disposed opposite to the first drive electrode and the second drive electrode; a display function layer disposed between the first pixel electrode and the first drive electrode and between the second pixel electrode and the second drive electrode; a first signal line; a first switch disposed between the first signal line and the first drive electrode; and a second switch disposed between the first signal line and the second drive electrode. The first switch and the second switch are turned into an on state in a first period, the first switch is turned into an on state and the second switch is turned into an off state in a second period, and the first switch is turned into an off state and the second switch is turned into an on state in a third period.

As still another aspect, a display device performs touch detection and display in a time division manner. The display device includes: a drive electrode to which a drive signal for the touch detection and a drive voltage for the display are supplied in a time division manner, the drive signal is supplied to the drive electrode through a first wiring in a period of the touch detection, and the drive voltage is supplied to the drive electrode through the first wiring in a period of the display.

BRIEF DESCRIPTIONS OF THE DRAWINGS

Figure 10:
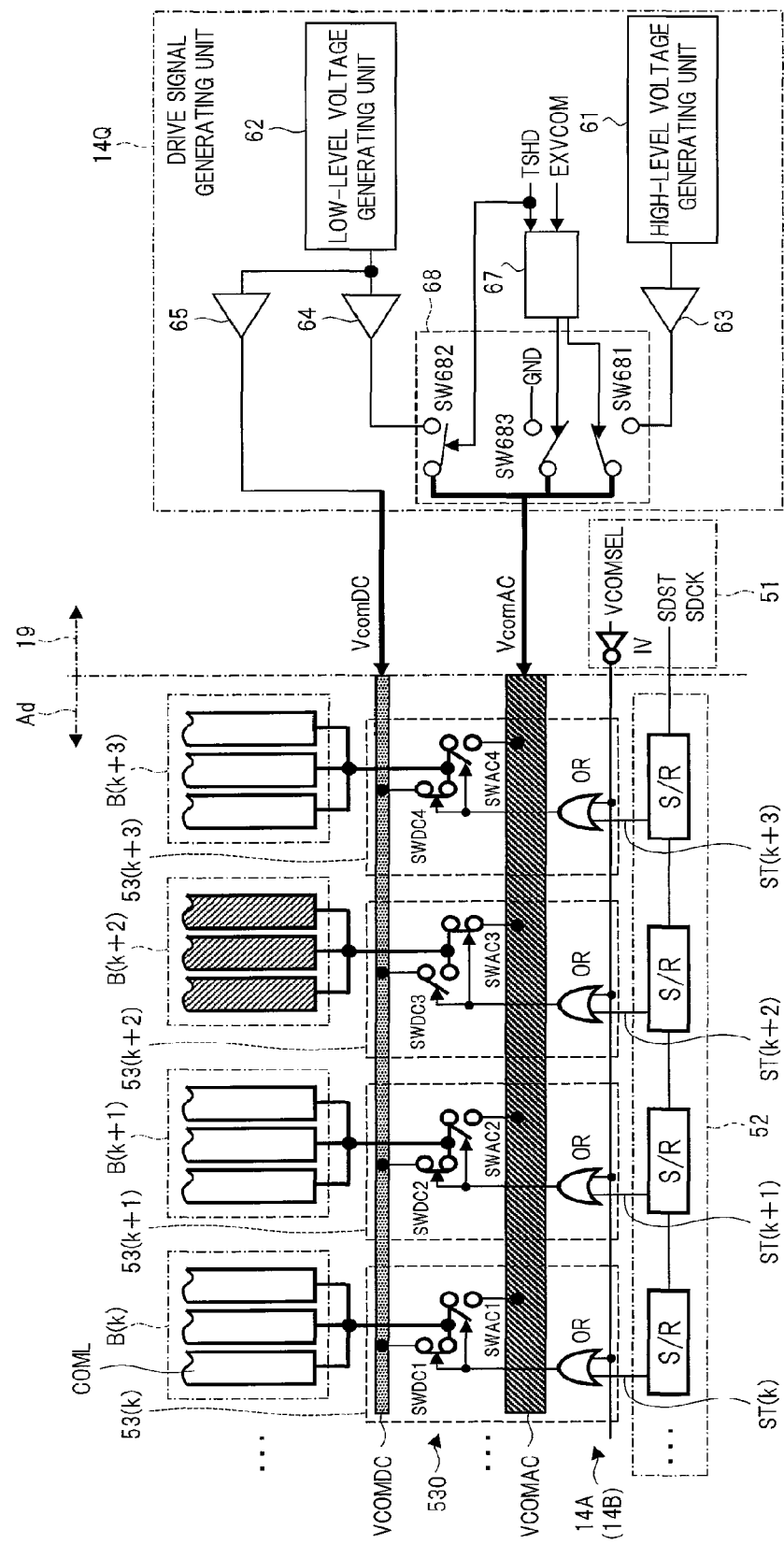
Figure 11:
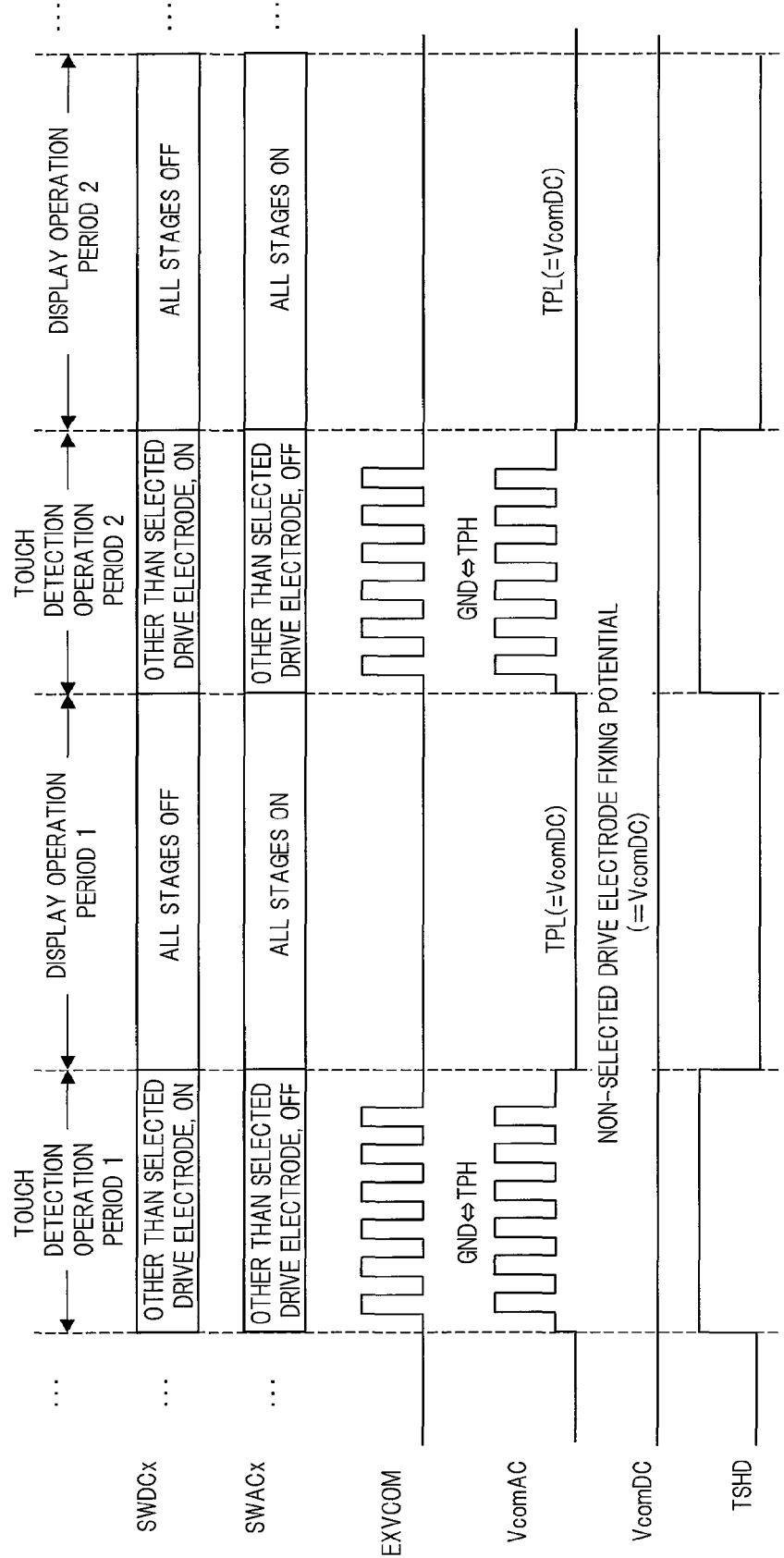

FIG. 10 is a block diagram illustrating an example of the configuration of the drive signal generating unit and the drive electrode scanning unit of the drive electrode driver according to the second embodiment; and FIG. 11 is an explanatory diagram illustrating an example of the timing waveforms of the touch detection operation and the display operation in the operation of the display device with a touch detection function according to the second embodiment.

DESCRIPTIONS OF THE PREFERRED EMBODIMENTS

Hereinafter, each embodiment of the present invention will be described with reference to the drawings. Note that the disclosure is mere an example, and it is a matter of course that any alteration that is easily made by a person skilled in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention.

In addition, the same or relevant reference characters are applied to the same elements as those described in relation to the foregoing drawings in the present specification and the respective drawings, and detailed descriptions thereof will be appropriately omitted in some cases.

First Embodiment

The display device with a touch detection function according to the first embodiment will be described with reference to FIGS. 1 to 9. The display device with a touch detection function according to the first embodiment is not limited to this, and is used in mobile information terminals such as smart phones and mobile phones.

<Display Device with Touch Detection Function>

Figure 1:
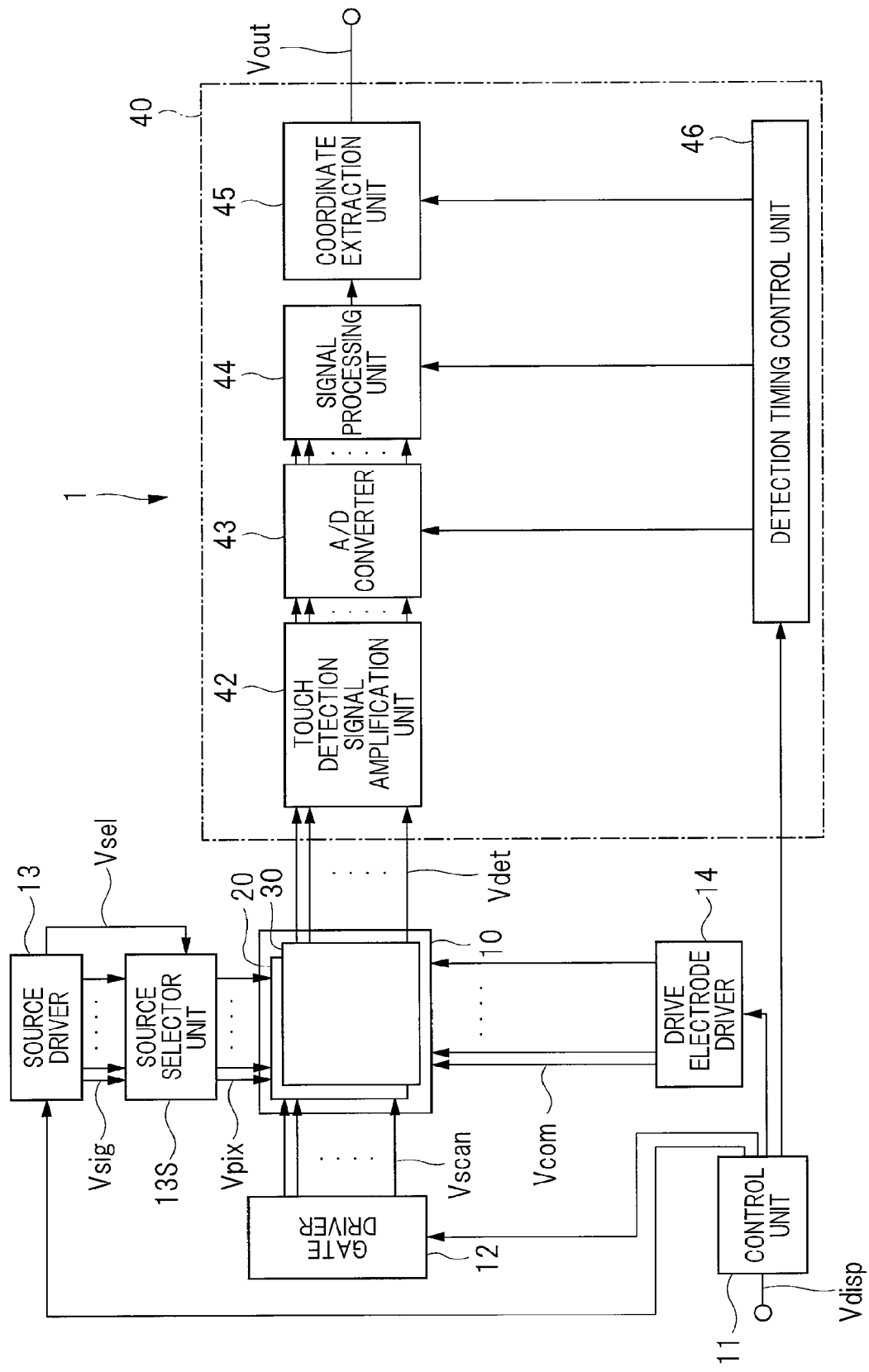
FIG. 1 is a block diagram illustrating an example of the schematic configuration of a display device with a touch detection function according to the first embodiment.

First, the configuration of the display device with a touch detection function according to the first embodiment will be described with reference to FIG. 1. FIG. 1 is a block diagram illustrating an example of a schematic configuration of a display device with a touch detection function according to the first embodiment.

The display device with a touch detection function 1 includes a display with a touch detection function 10, a control unit 11, a gate driver 12, a source driver 13, a source selector unit 13S, a drive electrode driver 14 and a touch detection unit 40. In the display device with a touch detection function 1, the touch detection function is incorporated in the display with a touch detection function 10. The display with a touch detection function 10 is a device in which a liquid crystal display 20 using a liquid crystal display element as the display element and an electrostatic capacitance type touch detection device 30 are integrated.

The liquid crystal display 20 is a device which performs display by sequentially scanning each horizontal line in accordance with the scanning signal Vscan supplied from the gate driver 12. The control unit 11 is a circuit which supplies respective control signals to the gate driver 12, the source driver 13, the drive electrode driver 14 and the touch detection unit 40 based on the video signal Vdisp supplied from the outside, thereby controlling them so that they operate in synchronization with each other.

The gate driver 12 has a function of sequentially selecting one horizontal line to be the target of the display drive of the display with a touch detection function 10 based on the control signal supplied from the control unit 11.

The source driver 13 is a circuit which supplies the pixel signal Vpix to each of the pixels Pix (sub-pixels SPix) described below (FIG. 4) of the display with a touch detection function 10 based on the control signal supplied from the control unit 11. The source driver 13 generates image signals Vsig obtained by performing the time division multiplexing on the pixel signals Vpix for a plurality of sub-pixels SPix of the liquid crystal display 20 from the control signal for one horizontal line, and supplies the image signals Vsig to the source selector unit 13S. In addition, the source driver 13 generates a switch control signal Vsel required to separate the pixel signals Vpix multiplexed in the image signals Vsig, and supplies the switch control signal Vsel to the source selector unit 13S together with the image signals Vsig.

The drive electrode driver 14 is a circuit which supplies the drive signals Vcom to the drive electrodes COML described below (FIG. 4) of the display with a touch detection function 10 based on the control signal supplied from the control unit 11. The drive signal Vcom includes a drive signal for touch detection (touch detection drive signal or referred to also as drive signal hereinafter) VcomAC and a display drive voltage VcomDC corresponding to a voltage for display.

The touch detection unit 40 is a circuit which detects, based on the control signal supplied from the control unit 11 and the touch detection signal Vdet supplied from the touch detection device 30 of the display with a touch detection function 10, the presence or absence of a touch (contact state) on the touch detection device 30 and obtains coordinates of the touch and others in the touch detection region when the touch is present. This touch detection unit 40 includes a touch detection signal amplification unit 42, an A/D converter 43, a signal processing unit 44, a coordinate extraction unit 45 and a detection timing control unit 46.

The touch detection signal amplification unit 42 amplifies the touch detection signals Vdet supplied from the touch detection device 30. Note that the touch detection signal amplification unit 42 may include a low-pass analog filter which removes the high frequency components (noise components) contained in the touch detection signals Vdet and extracts the touch components to output them.

The touch detection device 30 is configured to perform the touch detection by sequentially scanning each detection block in accordance with the drive signals Vcom (drive signals VcomAC described below) supplied from the drive electrode driver 14.

The touch detection device 30 is configured to output the touch detection signals Vdet for each detection block of the drive electrodes COML from a plurality of touch detection electrodes TDL described below (FIG. 5) to supply the touch detection signals Vdet to the A/D converter 43 of the touch detection unit 40.

The A/D converter 43 is a circuit which samples the respective analog signals output from the touch detection signal amplification unit 42 at a timing synchronized with the drive signals VcomAC to convert the analog signals into digital signals.

The signal processing unit 44 includes a digital filter which reduces the frequency components (noise components) other than the frequency, at which the drive signals VcomAC are sampled, contained in the output signals of the A/D converter 43. The signal processing unit 44 is a logic circuit which detects the presence or absence of a touch on the touch detection device 30 based on the output signals of the A/D converter 43. For example, the signal processing unit 44 compares the signal of the detected voltage difference due to a finger with the predetermined threshold voltage, and determines the contact state of the external proximity object if the voltage difference is equal to or higher than the threshold voltage. On the other hand, the signal processing unit 44 compares the detected digital voltage with the predetermined threshold voltage, and determines the non-contact state of the external proximity object if the voltage difference is less than the threshold voltage. In this way, the touch detection unit 40 is capable of the touch detection.

The coordinate extraction unit 45 is a logic circuit which obtains the touch panel coordinates when a touch is detected in the signal processing unit 44. The detection timing control unit 46 controls the A/D converter 43, the signal processing unit 44 and the coordinate extraction unit 45 so that they operate in synchronization. The coordinate extraction unit 45 outputs the touch panel coordinates as a signal output Vout.

<Module>

Figure 2:
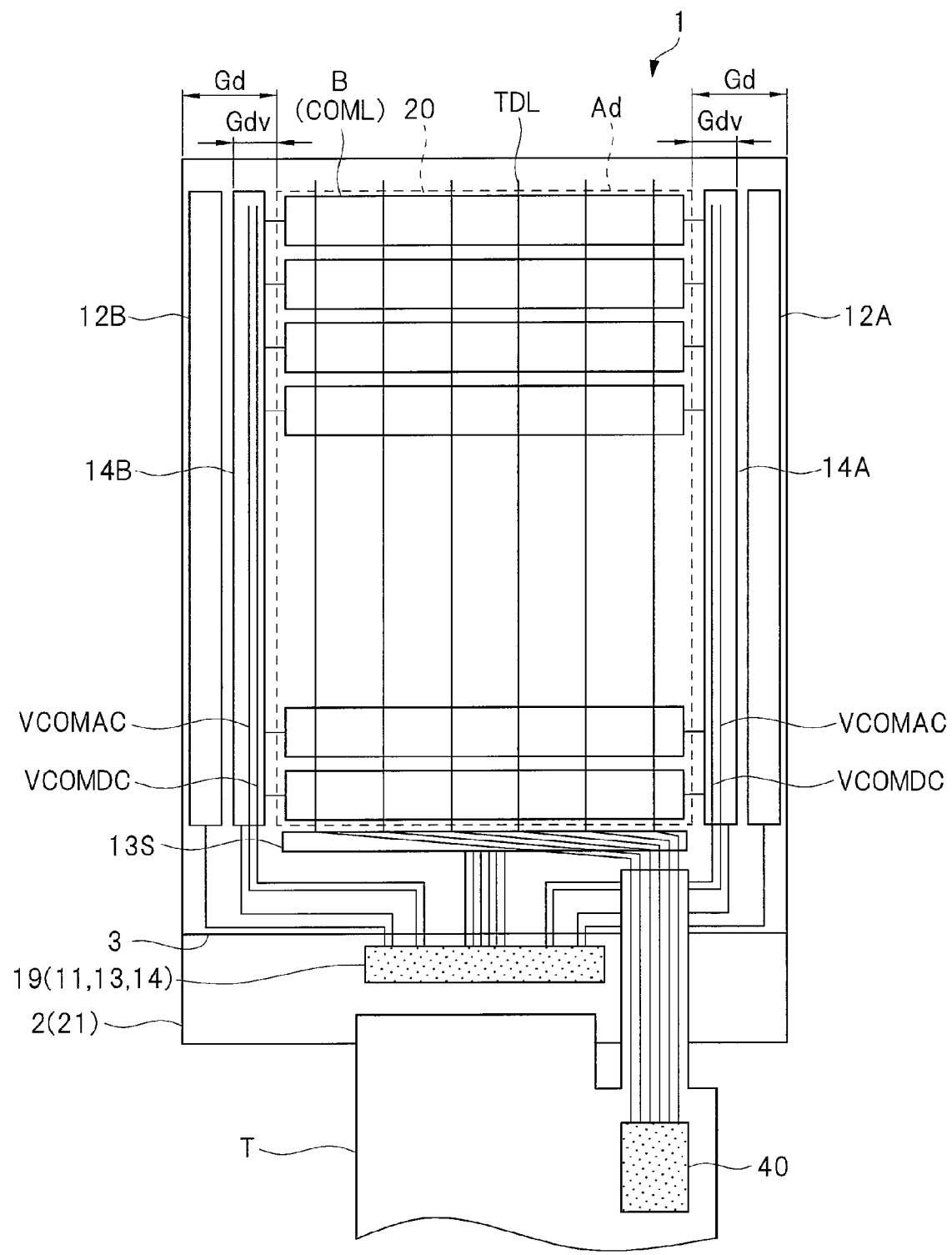
FIG. 2 is a diagram illustrating an example of the module mounted with the display device with a touch detection function according to the first embodiment.

FIG. 2 is a diagram illustrating an example of a module mounted with the display device with a touch detection function 1 according to the first embodiment.

As illustrated in FIG. 2, the display device with a touch detection function 1 includes the liquid crystal display 20, the gate drivers 12 (12A and 12B), drive electrode scanning units 14A and 14B, the source selector unit 13S and a COG (Chip On Glass) 19. The COG 19 includes the control unit 11, the source driver 13 and the drive electrode driver 14 illustrated in FIG. 1. The gate drivers 12A and 12B, the drive electrode scanning units 14A and 14B and the source selector unit 13S are formed on the TFT substrate 21 which is a glass substrate. The COG 19 is a chip mounted on the TFT substrate 21, and incorporates respective circuits necessary for the display operation such as the control unit 11 and the source driver 13 illustrated in FIG. 1. Note that the display device with a touch detection function 1 may incorporate circuits such as the gate drivers 12 and the source selector unit 13S in the COG 19.

The display device with a touch detection function 1 illustrated in FIG. 2 schematically illustrates the drive electrode blocks B of the drive electrodes COML and the touch detection electrodes TDL formed so as to three-dimensionally cross the drive electrode blocks B (drive electrodes COML) in the direction perpendicular to the surface of the TFT substrate 21. In addition, the display device with a touch detection function 1 includes the drive electrodes COML and the scanning signal lines GCL described below (FIG. 4) formed so as to extend in the direction parallel to the drive electrode COML without crossing the drive electrode COML in the direction perpendicular to the surface of the TFT substrate 21.

In addition, the drive electrodes COML are divided into a plurality of stripe-shaped electrode patterns extending in one direction. When the touch detection operation is performed, the drive signals VcomAC are sequentially supplied to the respective electrode patterns by the drive electrode driver 14. At the same time, the plurality of stripe-shaped electrode patterns, to which the drive signals VcomAC are supplied, of the drive electrodes COML are the drive electrode blocks B illustrated in FIG. 2. The drive electrode blocks B (drive electrodes COML) are formed to extend in the short side direction (lateral direction) of the TFT substrate and are arranged in parallel in the long side direction (longitudinal direction), and the touch detection electrodes TDL are formed to extend in the long side direction of the TFT substrate 21 and are arranged in parallel in the short side direction.

The outputs of the touch detection electrodes TDL are connected through a flexible printed circuit board T to the touch detection unit 40 disposed on the short side of the TFT substrate 21 and mounted on the flexible printed circuit board T. As described above, the touch detection unit 40 is mounted on the flexible printed circuit board T, and is connected to each of the plurality of touch detection electrodes TDL arranged in parallel.

The source selector unit 13S is formed by using TFT elements near the display region Ad on the TFT substrate 21. In the display region Ad, a large number of pixels Pix described below (FIG. 4) are arranged in a matrix shape. Frame regions Gd and Gd positioned outside the display region Ad are regions where the pixels Pix are not disposed when viewed in the direction perpendicular to the surface of the TFT substrate 21. The gate drivers 12A and 12B and the drive electrode scanning units 14A and 14B of the drive electrode driver 14 are disposed in the frame regions Gd and Gd.

The gate driver 12 illustrated in FIG. 1 includes the gate drivers 12A and 12B and is formed by using TFT elements on the TFT substrate 21. The gate drivers 12A and 12B can be driven from both sides with interposing the display region Ad where the pixels Pix are arranged in a matrix shape.

The drive electrode scanning units 14A and 14B are formed by using TFT elements on the TFT substrate 21. The drive electrode scanning units 14A and 14B receive the supply of the potential fixing voltage VcomDC of the non-selected drive electrodes through the conductive wiring VCOMDC and receive the supply of the touch detection drive signal VcomAC through the conductive wiring VCOMAC from the drive electrode driver 14 in the COG 19. Then, the drive electrode scanning units 14A and 14B can drive each of the plurality of drive electrode blocks B arranged in parallel from both sides.

The wirings VCOMDC and VCOMAC are provided on the TFT substrate 21, and are disposed in the frame regions Gd and Gd positioned outside the display region Ad in a direction perpendicular to the TFT substrate 21. The wirings VCOMDC and VCOMAC are formed to extend in the long side direction of the TFT substrate 21 in the frame regions Gd and Gd, and the wiring VCOMDC is disposed between the drive electrode COML and the wiring VCOMAC.

<Display with Touch Detection Function>

Figure 3:
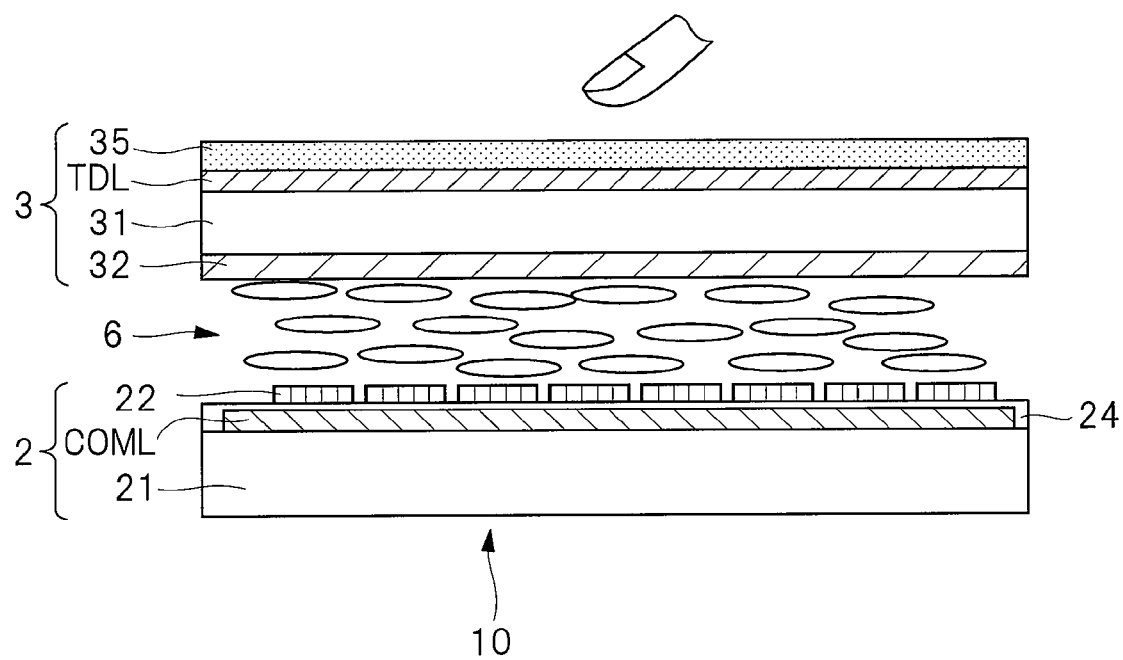
FIG. 3 is a cross-sectional view illustrating an example of the schematic cross-sectional structure of the display device with a touch detection function according to the first embodiment.
Figure 4:
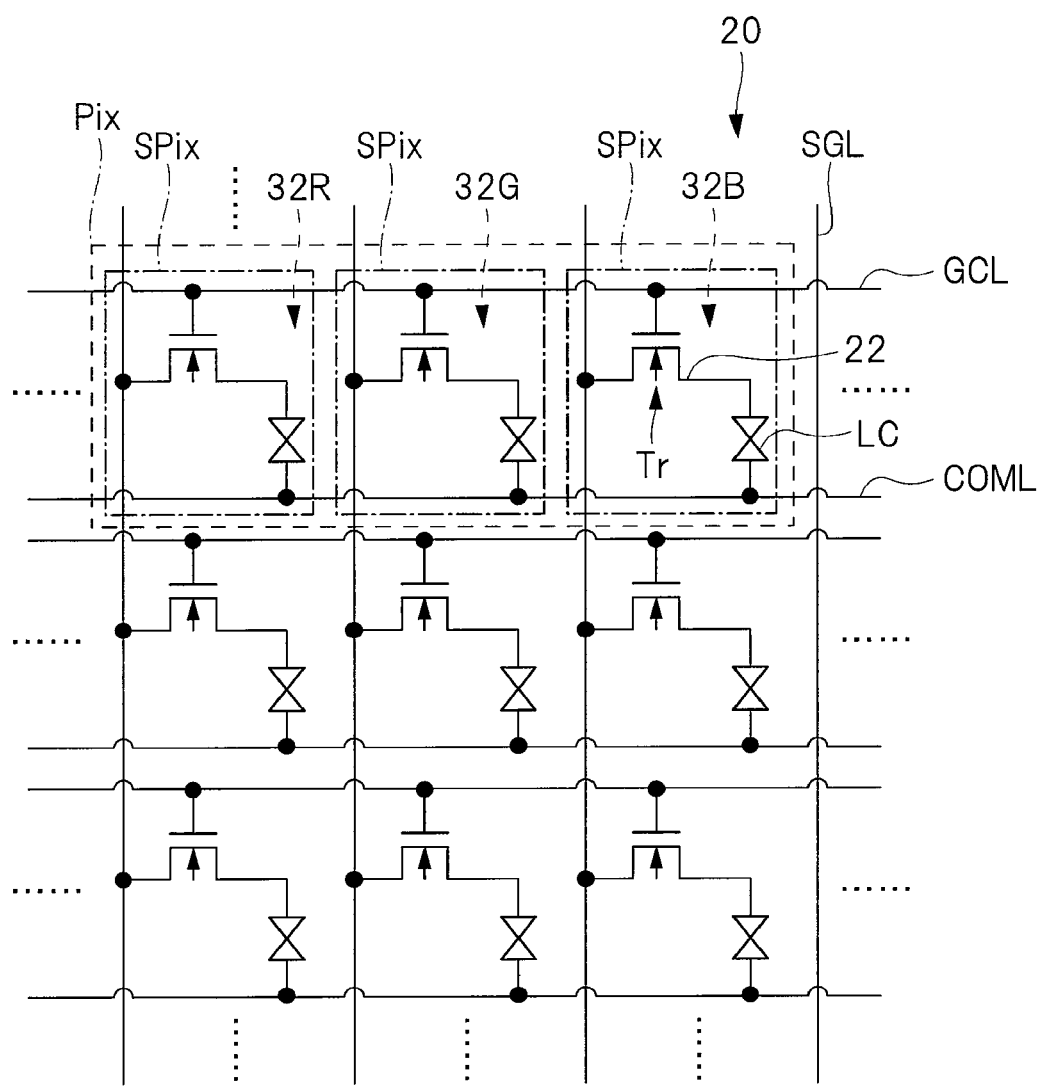
FIG. 4 is a circuit diagram illustrating an example of the pixel array of a liquid crystal display according to the first embodiment.

Next, a configuration example of the display with a touch detection function 10 will be described in detail. FIG. 3 is a cross-sectional view illustrating an example of a schematic cross-sectional structure of the display with a touch detection function 10 according to the first embodiment. FIG. 4 is a circuit diagram illustrating an example of a pixel array of the liquid crystal display 20 according to the first embodiment.

As illustrated in FIG. 3, the display with a touch detection function 10 includes a pixel substrate 2, an opposing substrate 3 disposed opposite to the pixel substrate 2 in a direction perpendicular to the surface of the pixel substrate 2 and a liquid crystal layer 6 inserted between the pixel substrate 2 and the opposing substrate 3.

The liquid crystal layer 6 modulates light passing therethrough according to a state of an electric field, and a liquid crystal display using a liquid crystal of a transverse electric field mode such as FFS (Fringe-Field Switching) or IPS (In-Place Switching) is used. Note that an orientation film may be provided between the liquid crystal layer 6 and the pixel substrate 2 and between the liquid crystal layer 6 and the opposing substrate 3 illustrated in FIG. 3.

The opposing substrate 3 includes a glass substrate 31 and a color filter 32 formed on one surface of the glass substrate 31 (surface close to the liquid crystal layer 6). The touch detection electrodes TDL corresponding to the detection electrodes of the touch detection device 30 are formed on the other surface of the glass substrate 31, and a polarizing plate 35 is further disposed on the touch detection electrodes TDL.

The pixel substrate 2 includes the TFT substrate 21 as a circuit board, the plurality of pixel electrodes 22 disposed in a matrix shape on the TFT substrate 21, the plurality of drive electrodes COML formed between the TFT substrate 21 and the pixel electrodes 22 and an insulating layer 24 insulating the pixel electrodes 22 from the drive electrodes COML.

On the TFT substrate 21, thin film transistor (TFT) elements Tr of each of the sub-pixels SPix illustrated in FIG. 4 and wirings such as a pixel signal line SGL which supplies a pixel signal Vpix to each of the pixel electrodes 22 and a scanning signal line GCL which drives each of the TFT elements Tr are formed. Thus, the pixel signal lines SGL extend in a plane parallel to the surface of the TFT substrate 21 and supply the pixel signals Vpix for displaying an image on the pixels. The liquid crystal display 20 illustrated in FIG. 4 includes a plurality of sub-pixels SPix arranged in a matrix shape. The sub-pixel SPix includes a TFT element Tr and a liquid crystal element LC. The TFT element Tr is constituted of a thin-film transistor and is constituted of an n-channel MOS (Metal Oxide Semiconductor) TFT in this example. A source of the TFT element Tr is connected to the pixel signal line SGL, a gate is connected to the scanning signal line GCL, and a drain is connected to one end of the liquid crystal element LC. The liquid crystal element LC has one end connected to the drain of the TFT element Tr and the other end connected to the drive electrode COML. The liquid crystal element LC is a display function layer controlled by a voltage generated between the pixel electrode 22 and the drive electrode COML.

As for the color filter 32 illustrated in FIG. 3, for example, color regions of the color filter colored in three colors of red (R), green (G) and blue (B) are cyclically arranged, and color regions 32R, 32G and 32B of three colors R, G and B corresponding to each of the sub-pixels SPix illustrated in FIG. 4 are set as one pixel Pix. The color filter 32 faces the liquid crystal layer 6 in a direction perpendicular to the TFT substrate 21. Note that the color filter 32 may be a combination of other colors as long as colored in different colors.

The sub-pixel SPix illustrated in FIG. 4 is mutually connected to other sub-pixels SPix belonging to the same row of the liquid crystal display 20 by the scanning signal line GCL. The scanning signal line GCL is connected to the gate driver 12, and the scanning signal Vscan is supplied from the gate driver 12. In addition, the sub-pixel SPix is mutually connected to other sub-pixels SPix belonging to the same column of the liquid crystal display 20 by the pixel signal line SGL. The pixel signal line SGL is connected to the source driver 13, and the pixel signal Vpix is supplied from the source driver 13.

The gate driver 12 illustrated in FIG. 1 applies the scanning signal Vscan to the gate of the TFT element Tr of the sub-pixel SPix through the scanning signal line GCL illustrated in FIG. 4, thereby sequentially selecting one row (one horizontal line) of the sub-pixels SPix formed in a matrix shape in the liquid crystal display 20 as the target of the display drive. The source driver 13 and the source selector unit 13S illustrated in FIG. 1 supply the pixel signals Vpix through the pixel signal lines SGL illustrated in FIG. 4 to each of the sub-pixels SPix constituting one horizontal line sequentially selected by the gate driver 12. Then, in these sub-pixels SPix, the display of one horizontal line is performed in accordance with the supplied pixel signals Vpix. The drive electrode driver 14 illustrated in FIG. 1 applies the drive signals Vcom to drive the drive electrodes COML for each drive electrode block including a predetermined number of drive electrodes COML illustrated in FIGS. 3 and 4.

As described above, in the liquid crystal display 20, the gate driver 12 drives the scanning signal lines GCL so as to perform the line sequential scanning in a time division manner, so that one horizontal line is sequentially selected. In addition, in the liquid crystal display 20, the source driver 13 and the source selector unit 13S supply the pixel signals Vpix to the sub-pixels SPix belonging to one horizontal line, so that the display is performed for each horizontal line. When performing the display operation, the drive electrode driver 14 applies the display drive voltage VcomDC to the drive electrode block including the drive electrodes COML corresponding to the one horizontal line.

Figure 5:
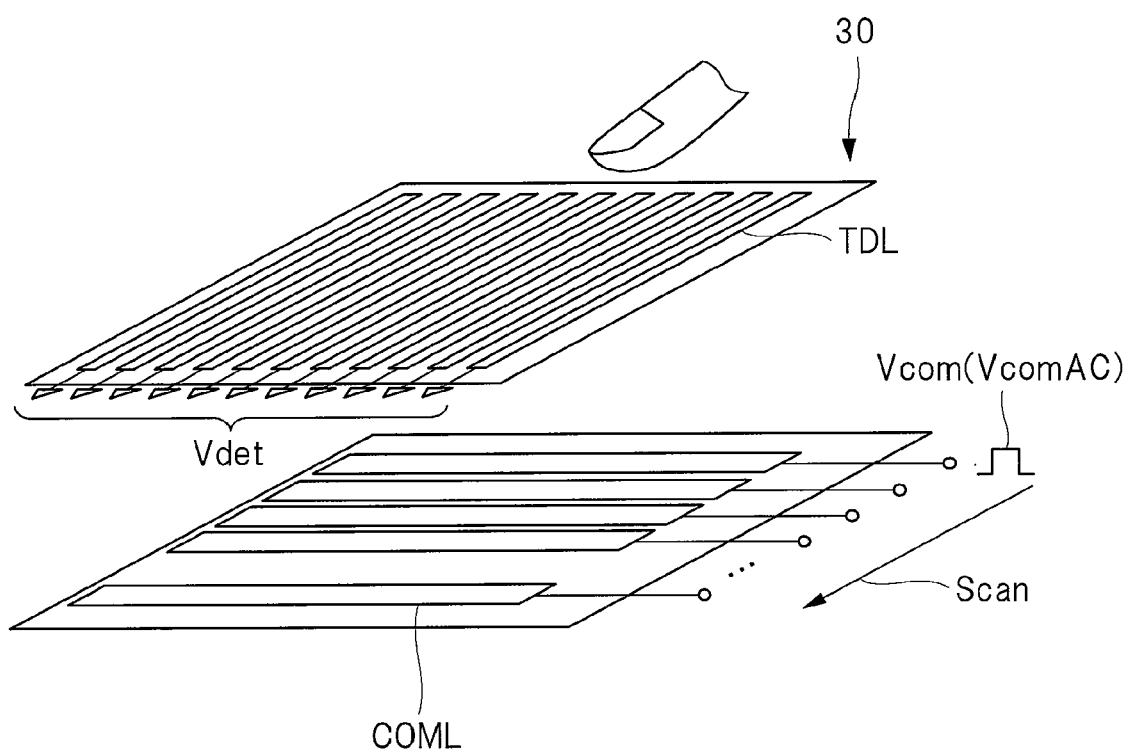
FIG. 5 is a perspective view illustrating an example of the configuration of the drive electrodes and the touch detection electrodes of the touch detection device according to the first embodiment.

The drive electrode COML according to the first embodiment functions as a drive electrode of the liquid crystal display 20 and functions also as a drive electrode of the touch detection device 30. FIG. 5 is a perspective view illustrating an example of the configuration of the drive electrodes and the touch detection electrodes of the touch detection device 30 according to the first embodiment. The drive electrodes COML illustrated in FIG. 5 face the pixel electrodes 22 in a direction perpendicular to the surface of the TFT substrate 21 as illustrated in FIG. 3. The touch detection device 30 includes the drive electrodes COML disposed on the pixel substrate 2 and the touch detection electrodes TDL disposed on the opposing substrate 3. The touch detection electrodes TDL are constituted of stripe-shaped electrode patterns extending in a direction crossing the extending direction of the electrode patterns of the drive electrodes COML. In addition, the touch detection electrodes TDL face the drive electrodes COML in the direction perpendicular to the surface of the TFT substrate 21.

Each of the electrode patterns of the touch detection electrodes TDL is connected to each input of the touch detection signal amplification unit 42 of the touch detection unit 40. Electrostatic capacitance is generated at the crossing portions of the electrode patterns of the drive electrodes COML and the touch detection electrodes TDL. Note that the touch detection electrodes TDL or the drive electrodes COML (drive electrode block) are not limited to those having a shape of being divided into stripes. For example, the touch detection electrodes TDL or the drive electrodes COML (drive electrode block) may have a comb-tooth shape. Alternatively, the touch detection electrodes TDL or the drive electrodes COML (drive electrode block) are only required to be divided into plural portions, and the slit for dividing the drive electrodes COML may have a straight shape or a curved shape.

With this configuration, in the touch detection device 30, when performing the touch detection operation, the drive electrode driver 14 drives the drive electrode blocks B illustrated in FIG. 2 so as to perform the line sequential scanning in a time division manner. As a result, the drive electrode block B (one detection block) of the drive electrodes COML to which the drive signals Vcom (VcomAC) are applied is sequentially selected in the scanning direction Scan. Then, the touch detection device 30 outputs the touch detection signals Vdet from the touch detection electrodes TDL. The touch detection device 30 performs the touch detection of one detection block in this manner. Also, the position where an external proximity object contacts or approaches can also be detected by the scanning over the entire touch detection surface of the touch detection device 30.

<Drive Signal Generating Unit and Drive Electrode Scanning Unit of Drive Electrode Driver>

Figure 6:
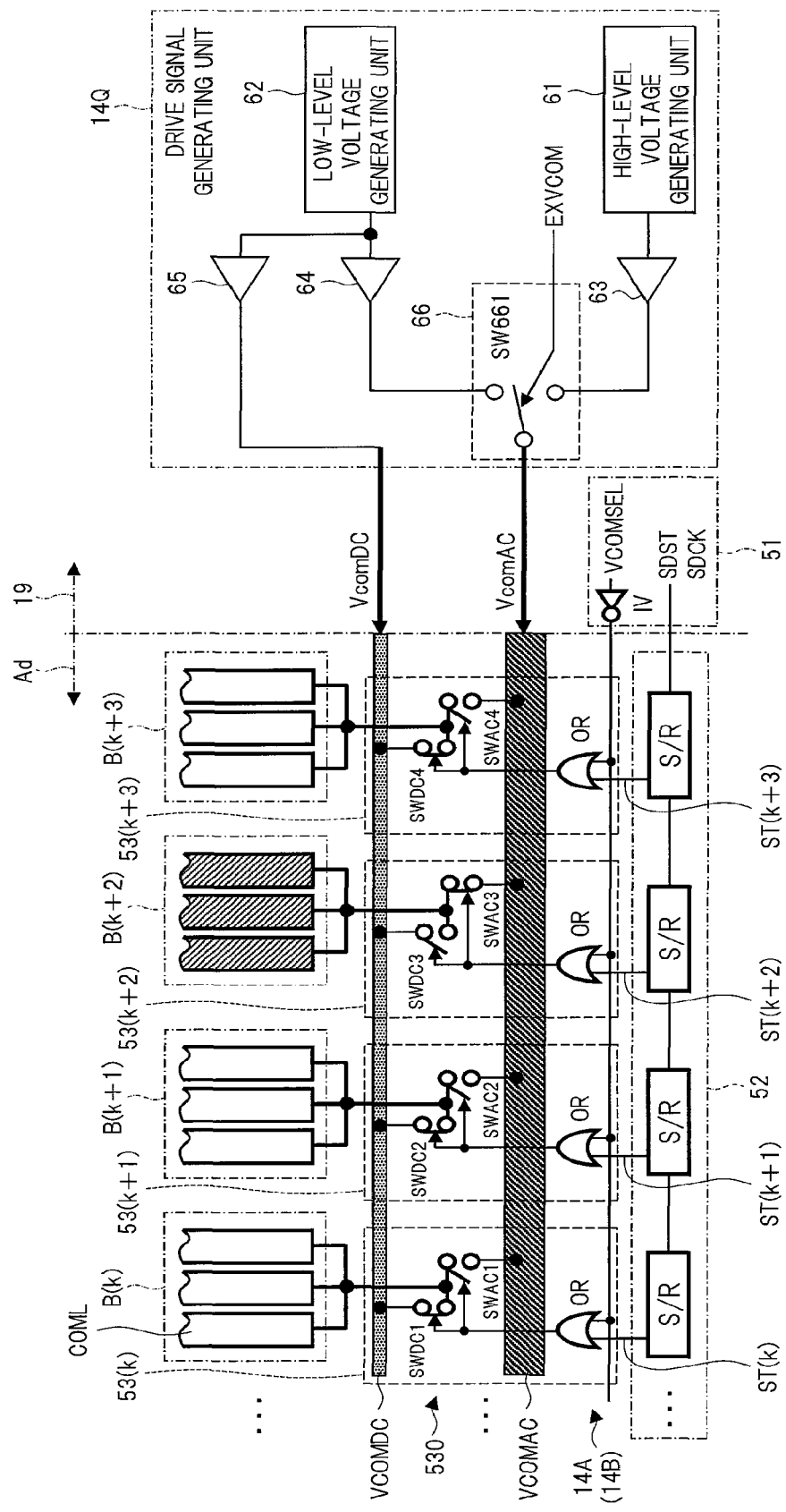
FIG. 6 is a block diagram illustrating an example of the configuration of the drive signal generating unit and the drive electrode scanning unit of the drive electrode driver according to the first embodiment.

FIG. 6 is a block diagram illustrating an example of the configuration of the drive signal generating unit and the drive electrode scanning units 14A and 14B of the drive electrode driver 14 according to the first embodiment.

A drive signal generating unit 14Q of the drive electrode driver 14 according to the first embodiment includes a high-level voltage generating unit 61, a low-level voltage generating unit 62, buffers 63, 64 and 65 and a switching circuit 66. The drive signal generating unit 14Q is mounted on the COG 19.

The high-level voltage generating unit 61 generates a high-level voltage TPH of the drive signal VcomAC. The low-level voltage generating unit 62 generates a DC voltage of the display drive voltage VcomDC. The voltage generated by the low-level voltage generating unit 62 is used also as a low-level voltage TPL of the drive signal VcomAC.

The buffer 63 is connected to the high-level voltage generating unit 61, and outputs the voltage TPH supplied from the high-level voltage generating unit 61 while performing the impedance conversion, thereby supplying the voltage TPH to the switching circuit 66. The buffer 64 is connected to the low-level voltage generating unit 62, and outputs the voltage TPL supplied from the low-level voltage generating unit 62 while performing the impedance conversion, thereby supplying the voltage TPL to the switching circuit 66.

The switching circuit 66 is connected to the buffers 63 and 64, and includes a switch SW661 which turns on and off (switching operation) based on the drive control signal EXVCOM. In the switching circuit 66, the switch SW661 performs the switching operation based on the drive control signal EXVCOM, so that the case where the drive control signal EXVCOM is at a high level and the case where the drive control signal EXVCOM is at a low level are alternately repeated and the drive signal VcomAC is generated. The switching circuit 66 outputs the voltage TPH supplied from the buffer 63 when the drive control signal EXVCOM is at a high level, and outputs the voltage TPL supplied from the buffer 64 when the drive control signal EXVCOM is at a low level. The switching circuit 66 outputs the voltage TPL (VcomDC) supplied from the buffer 64 when the drive control signal EXVCOM is at a low level based on the drive control signal EXVCOM. The voltage output from the switching circuit 66 is supplied to the wiring VCOMAC.

The buffer 65 is connected to the low-level voltage generating unit 62, and outputs the voltage TPL supplied from the low-level voltage generating unit 62 while performing the impedance conversion, thereby outputting the voltage TPL as a DC voltage of the potential fixing voltage VcomDC of the non-selected drive electrode. The voltage output from the buffer 65 is supplied to the wiring VCOMDC.

The drive electrode scanning units 14A and 14B of the drive electrode driver 14 according to the first embodiment each include a scanning control unit 51, a touch detection scanning unit 52 and a drive unit 530. The drive unit 530 includes a number of drive sections 53 equal to that of the drive electrode blocks B. In FIG. 6, in the case where the number of the drive electrode blocks B is set as n, four drive sections 53($k$) to 53($k$+3) among them are illustrated by way of example. The scanning control unit 51 is mounted on the COG 19. In addition, the touch detection scanning unit 52 and the drive unit 530 are disposed in the frame region Gd surrounding the display region Ad. Hereinafter, when any one of the plurality of drive sections 53($k$) to 53($k$+3) is to be referred to, the drive section 53 may simply be used.

The scanning control unit 51 supplies a control signal SDCK and a scanning start signal SDST to the touch detection scanning unit 52 based on the control signal supplied from the control unit 11. The drive signal VcomAC output from the switching circuit 66 of the drive signal generating unit 14Q described above is supplied to the wiring VCOMAC. In addition, the display drive voltage VcomDC output from the buffer 65 of the drive signal generating unit 14Q described above is supplied to the wiring VCOMDC.

The scanning control unit 51 inverts the drive electrode selection signal VCOMSEL through the inverter IV and supplies it to the drive unit 530. The drive electrode selection signal VCOMSEL is a signal for identifying a period in which the drive signal VcomAC is supplied from the switching circuit 66 of the drive signal generating unit 14Q to the drive electrodes COML via the wiring VCOMAC.

The touch detection scanning unit 52 includes a plurality of shift registers S/R, and generates scanning signals ST(k), ST(k+1), ST(k+2) and ST(k+3) for selecting the drive electrode COML to which the drive signal VcomAC is applied. Specifically, in the touch detection scanning unit 52, the shift register S/R synchronizes the scanning start signal SDST supplied from the scanning control unit 51 as a trigger with the control signal SDCK, the scanning start signal SDST is sequentially transferred for each transfer stage of the shift registers S/R, and the shift registers S/R are sequentially selected. The selected shift register S/R sends the scanning signals ST(k), ST(k+1), ST(k+2) and ST(k+3) to each of the logical sum circuits OR of the drive unit 530. In the touch detection scanning unit 52, for example, when the selected shift register S/R supplies a high-level signal as the k+2-th scanning signal ST(k+2) to the k+2-th drive section 53($k$+2), the drive section 53($k$+2) applies the drive signal VcomAC to a plurality of drive electrodes COML belonging to the k+2-th drive electrode block B(k+2). Hereinafter, when any one of the scanning signals ST(k), ST(k+1), ST(k+2) and ST(k+3) is to be referred to, the scanning signal ST may simply be used.

The drive unit 530 is a circuit which applies the display drive voltage VcomDC or the drive signal VcomAC supplied from the drive signal generating unit 14Q to the drive electrode COML based on the scanning signal ST supplied from the touch detection scanning unit 52 and the inverted signal of the drive electrode selection signal VCOMSEL supplied from the scanning control unit 51. The drive section 53 is disposed one by one so as to correspond to the output signal of the touch detection scanning unit 52, and applies the drive signal Vcom to the corresponding drive electrode block B.

The drive section 53 includes a logical sum circuit OR and a pair of switches SWAC1 and SWDC1 (SWAC2 and SWDC2, SWAC3 and SWDC3 or SWAC4 and SWDC4) for each of the drive electrode blocks B. The pairs of switches SWAC1 to SWAC4 and SWDC1 to SWDC4 are constituted of, for example, transistors. The on state where the switch is closed corresponds to the conduction state of the transistor, and the off state where the switch is opened corresponds to the non-conduction state of the transistor. FIG. 6 illustrates the connection state of each of the switches SWAC1 to SWAC4 and SWDC1 to SWDC4 in the case where the drive electrode block B(k+2) is selected in the touch detection operation period.

The logical sum circuit OR generates and outputs the logical sum (OR) of the scanning signal ST supplied from the touch detection scanning unit 52 and the inverted signal of the drive electrode selection signal VCOMSEL supplied from the scanning control unit 51. The logical sum circuit OR has a buffer function of amplification to the amplitude level capable of complementarily controlling the on and off of the pair of switches SWAC1 and SWDC1 (SWAC2 and SWDC2, SWAC3 and SWDC3 or SWAC4 and SWDC4). The pair of switches SWAC1 and SWDC1 is complementarily on-off controlled based on the signal supplied from the logical sum circuit OR. For example, the switch SWDC1 is turned off when the switch SWAC1 is on, and conversely the switch SWDC1 is turned on when the switch SWAC1 is off.

In the pair of switches SWAC1 and SWDC1, one end of the switch SWAC1 is connected to the wiring VCOMAC, and one end of the switch SWDC1 is connected to the wiring VCOMDC. Furthermore, the other end of the switch SWAC1 and the other end of the switch SWDC1 are connected, and then connected to a plurality of drive electrodes COML included in the corresponding drive electrode block B. The same goes for the other pairs of switches SWAC2 and SWDC2, SWAC3 and SWDC3 and SWAC4 and SWDC4. Namely, the switches SWAC1 to SWAC4 are disposed between the wiring VCOMAC and the drive electrode COML, and the switches SWDC1 to SWDC4 are disposed between the wiring VCOMDC and the drive electrode COML.

With this configuration, when the scanning signal ST is at a high level and the drive electrode selection signal VCOMSEL is at a high level, the drive section 53 connects the drive electrode block B to the wiring VCOMAC, and outputs the drive signal VcomAC as the drive signal Vcom to the drive electrode block B. In this state, the switch SWAC1 (SWAC2, SWAC3 or SWAC4) is closed (on state) and the switch SWDC1 (SWDC2, SWDC3 or SWDC4) is opened (off state) in the touch detection operation, and the drive signal VcomAC is output to the drive electrode block B selected by the touch detection.

When the scanning signal ST is at a low level and the drive electrode selection signal VCOMSEL is at a high level, the drive section 53 connects the drive electrode block B to the wiring VCOMDC, and outputs the drive voltage VcomDC as the drive signal Vcom to the drive electrode block B. In this state, the switch SWAC1 (SWAC2, SWAC3 or SWAC4) is opened (off state) and the switch SWDC1 (SWDC2, SWDC3 or SWDC4) is closed (on state) in the touch detection operation, and the drive electrode block B not selected by the touch detection is set to the fixing drive voltage VcomDC.

In addition, when the liquid crystal display 20 is in display operation, the drive section 53 outputs the display drive voltage VcomDC as the drive signal Vcom in the case where the drive electrode selection signal VCOMSEL is at a low level, the switches SWAC1 (SWAC2, SWAC3 and SWAC4) are all closed (on state) and the switches SWDC1 (SWDC2, SWDC3 and SWDC4) are all opened (off state) for each of the drive electrode blocks B.

Here, the drive electrode block B selected as the output destination of the drive signal VcomAC is a selected drive electrode block. The drive electrode block B not selected as the output destination of the drive signal VcomAC is a non-selected drive electrode block. For example, since the drive section 53(k+2) illustrated in FIG. 6 applies the drive signal VcomAC to a plurality of drive electrodes COML belonging to the k+2-th drive electrode block B(k+2), the drive electrode block B(k+2) is a selected drive electrode block. Thus, the drive electrode blocks B(k), B(k+1) and B(k+3) not selected as the output destination of the drive signal VcomDC are non-selected drive electrode blocks.

<Operation of Display device with Touch Detection Function>

Figure 7:
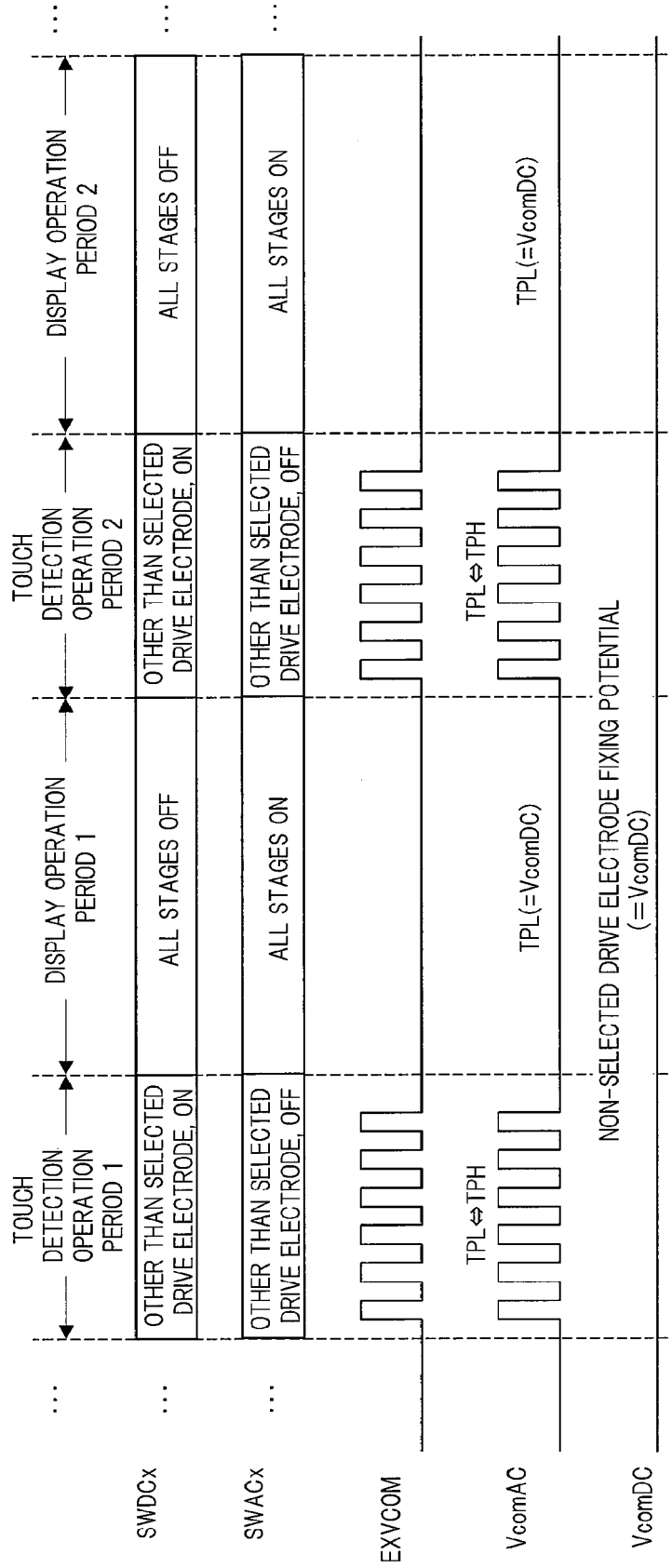
FIG. 7 is an explanatory diagram illustrating an example of the timing waveforms of the touch detection operation and the display operation in the operation of the display device with a touch detection function according to the first embodiment.

Next, the operation of the display device with a touch detection function 1 according to the first embodiment will be described with reference to FIGS. 1 and 7 and others. In the following description, the drive signal Vcom as a drive signal for display will be described as a display drive voltage VcomDC, and the drive signal Vcom as a drive signal for touch detection will be described as a drive signal VcomAC. FIG. 7 is an explanatory diagram illustrating an example of the timing waveforms of the touch detection operation and the display operation in the operation of the display device with a touch detection function 1 according to the first embodiment.

In the operation of the display device with a touch detection function 1, the control unit 11 supplies respective control signals to the gate driver 12, the source driver 13, the drive electrode driver 14 and the touch detection unit 40 based on the video signal Vdisp supplied from the outside, thereby controlling them so that they operate in synchronization with each other. The gate driver 12 supplies the scanning signals Vscan to the liquid crystal display 20 in the display operation period illustrated in FIG. 7, and sequentially selects one horizontal line to be the target of the display drive. The source driver 13 and the source selector unit 13S supply the pixel signal Vpix to each of the pixels Pix constituting one horizontal line selected by the gate driver 12 in the display operation period.

In the display operation period, the drive electrode driver 14 applies the display drive voltage VcomDC to the drive electrode block B relating to one horizontal line. In the touch detection operation period, the drive electrode driver 14 sequentially applies the drive signal VcomAC having higher frequency than the display drive voltage VcomDC to the drive electrode block B relating to the touch detection operation, and sequentially selects one detection block. The display with a touch detection function 10 performs the display operation based on the signals supplied from the gate driver 12, the source driver 13 and the drive electrode driver 14 in the display operation period. The display with a touch detection function 10 performs the touch detection operation based on the drive signals VcomAC supplied from the drive electrode driver 14 in the touch detection operation period, and outputs the touch detection signals Vdet from the touch detection electrodes TDL.

The touch detection signal amplification unit 42 amplifies and outputs the touch detection signals Vdet. The A/D converter 43 converts the analog signals output from the touch detection signal amplification unit 42 into digital signals at the timing synchronized with the drive signals VcomAC. The signal processing unit 44 detects the presence or absence of a touch on the touch detection device 30 based on the output signals of the A/D converter 43. The coordinate extraction unit 45 obtains the touch panel coordinates when a touch is detected in the signal processing unit 44, and outputs the touch panel coordinates as the signal output Vout.

Next, the touch detection operation and the display operation will be described based on FIG. 7. FIG. 7 illustrates the touch detection operation period 1, the display operation period 1, the touch detection operation period 2 and the display operation period 2 by way of example. The display operation periods 1 and 2 correspond to the first period in the present invention. As for the touch detection operation periods 1 and 2, the touch detection operation period 1 corresponds to the second period in the present invention, and the touch detection operation period 2 corresponds to the third period in the present invention.

As illustrated in FIG. 7, the display device with a touch detection function 1 according to the first embodiment supplies the drive signals Vcom (display drive voltage VcomDC and drive signal VcomAC) to the drive electrode COML in a time division manner separately in the touch detection operation (touch detection operation period) and the display operation (display operation period). Although the rectangular wave of the drive signal VcomAC swings plural times, the number of swings in one touch detection operation period is not particularly limited as long as it swings at least once.

Since the drive electrode COML functions as the drive electrode of the liquid crystal display 20 and functions also as the drive electrode of the touch detection device 30, the drive signal Vcom is applied to the drive electrode COML separately in the display operation period for performing the display operation and the touch detection operation period for performing the touch detection operation.

The drive electrode driver 14 applies the drive voltage VcomDC as the display drive voltage in the display operation period for performing the display operation. In addition, the drive electrode driver 14 applies the drive signal VcomAC as the touch detection drive signal in the touch detection operation period for performing the touch detection operation. Thus, in the display device with a touch detection function 1, the display drive voltage VcomDC and the drive signal VcomAC are supplied to the wiring VCOMAC at different timings. The waveform of the drive signal VcomAC is a waveform synchronized with the rectangular wave of the drive control signal EXVCOM. The drive signal VcomAC is an AC drive signal whose amplitude periodically changes between the low-level voltage TPL and the high-level voltage TPH (TPL⇔TPH).

In addition, as illustrated in FIG. 7, in the touch detection operation period, one of the switches SWACx of the selected drive electrodes (selected drive electrode block) is turned on (closed) and one of the corresponding switches SWDCx is turned off (opened), so that the scanning of the touch detection is performed by applying the drive signal VcomDC. In addition, in the touch detection operation period, all of the switches SWACx of the non-selected drive electrodes (non-selected drive electrode block) are turned off (opened) and all of the corresponding switches SWDCx are turned on (closed), so that the potential of the non-selected drive electrode is fixed to the drive voltage VcomDC.

For example, in the touch detection operation period 1, as illustrated in FIG. 6, when the drive electrode block B(k+2) is the selected drive electrode block, the switch SWAC3 is turned on, and the corresponding switch SWDC3 is turned off. In this case, since the drive electrode blocks B(k), B(k+1) and B(k+3) are the non-selected drive electrode blocks, the switches SWAC1, SWAC2 and SWAC4 are turned off, and the corresponding switches SWDC1, SWDC2 and SWDC4 are turned on.

The display operation period 1 comes after the touch detection operation period 1, and the drive electrode block B(k+3) is the selected drive electrode block in the touch detection operation period 2 after the display operation period 1. When the drive electrode block B(k+3) is the selected drive electrode block, the switch SWAC4 is turned on, and the corresponding switch SWDC4 is turned off. In this case, since the drive electrode blocks B(k), B(k+1) and B(k+2) are the non-selected drive electrode blocks, the switches SWAC1, SWAC2 and SWAC3 are turned off, and the corresponding switches SWDC1, SWDC2 and SWDC3 are turned on.

In the display device with a touch detection function 1, all of the switches SWACx (SWAC1, SWAC2, SWAC3 and SWAC4) are turned on, and all of the switches SWDCx (SWDC1, SWDC2, SWDC3 and SWDC4) are turned off in the display operation period, so that the display drive voltage VcomDC (low-level voltage TPL) is applied to the drive electrodes COML.

As described above, in the display device with a touch detection function 1 according to the first embodiment, the roles of the wiring VCOMDC and the wiring VCOMAC are as follows. The wiring VCOMAC corresponds to the first wiring or the first signal line in the present invention. The wiring VCOMDC corresponds to the second wiring or the second signal line in the present invention. During the touch detection operation period, the wiring VCOMAC supplies the touch detection drive signal VcomAC, and the wiring VCOMDC fixes the non-selected drive electrodes (non-selected drive electrode block) to the potential of the display drive voltage VcomDC. During the display operation period, the wiring VCOMAC supplies the display drive voltage VcomDC, and the wiring VCOMDC is not used.

More specifically, the potential for fixing the non-selected drive electrodes (DC drive voltage VcomDC) is supplied to the wiring VCOMDC. Furthermore, during the touch detection operation period, all of the non-selected drive electrodes are connected to the wiring VCOMDC. Furthermore, during the display operation period, the wiring VCOMDC is not connected to any drive electrode. On the other hand, to the wiring VCOMAC, the touch detection drive signal (TPL⇔TPH) is supplied during the touch detection operation period, and the display drive voltage (VcomDC) is supplied during the display operation period. Furthermore, during the touch detection operation period, the selected drive electrode is connected to the wiring VCOMAC, and the touch detection drive signal is supplied to the selected drive electrode. Furthermore, during the display operation period, all of the drive electrodes are connected to the wiring VCOMAC, and the display drive voltage is supplied to all of the drive electrodes.

As a result, since the role of the wiring VCOMDC can be limited only to the potential fixing of the non-selected drive electrodes during the touch detection operation period, the width of the wiring VCOMDC can be narrowed. As illustrated in FIG. 6, the width of the wiring VCOMDC disposed between the drive electrode COML and the wiring VCOMAC may be smaller than the width of the wiring VCOMAC. For example, in the panel which is long in the longitudinal direction and is short in the lateral direction as illustrated in FIG. 2 and has the structure where the wiring VCOMDC is laid in the left and right frame regions Gd, it is possible to contribute to the shrinkage (reduction of area) of the left and right frames in units of several tens of μm. More specifically, the width Gdv occupied by the drive electrode scanning unit 14A or 14B of the frame region Gd is reduced. Nowadays, the width of the left or right frame is typically about 1.0 to 0.5 mm, and therefore the effect of the shrinkage is large.

Comparative Example

Figure 8:
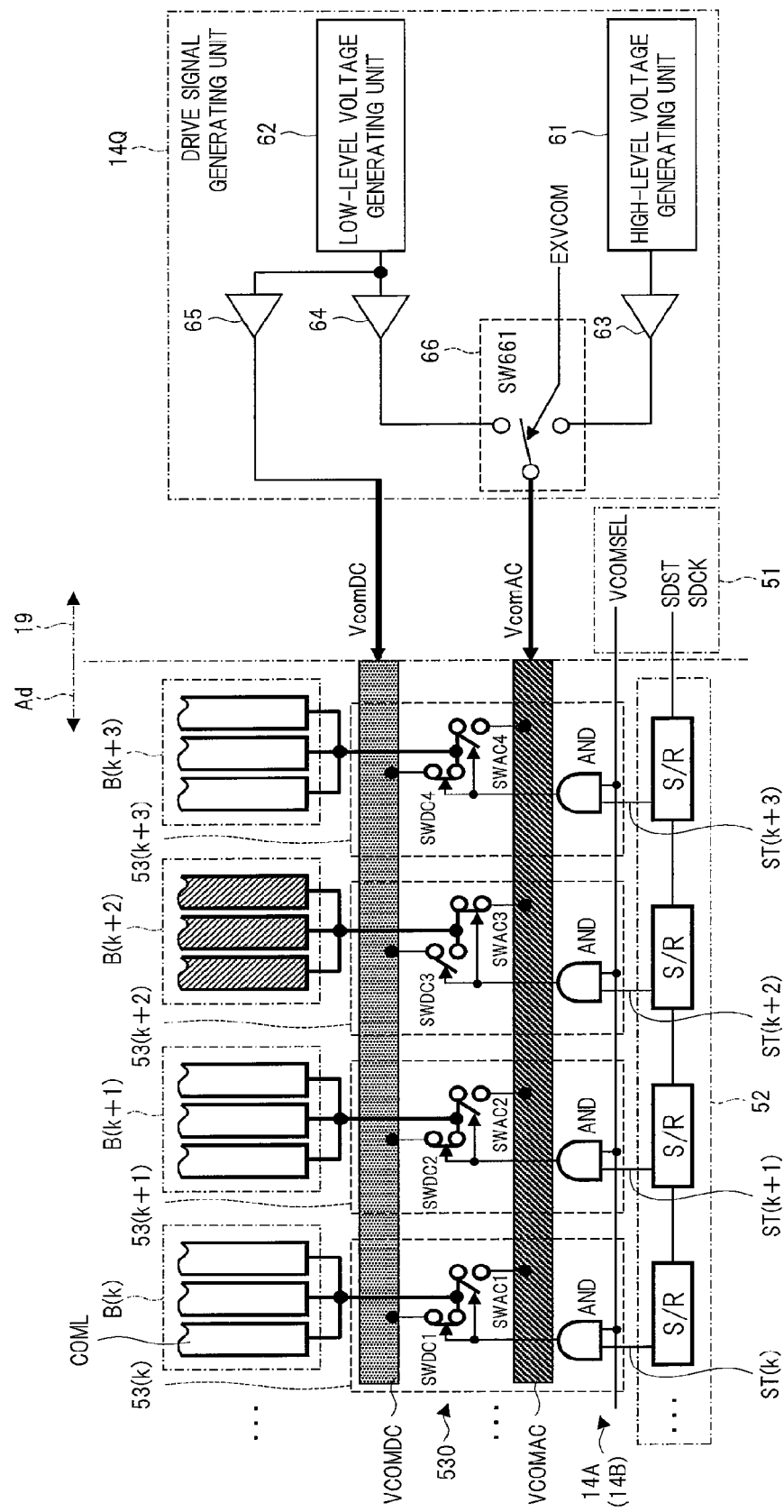
FIG. 8 is a block diagram illustrating an example of the configuration of the drive signal generating unit and the drive electrode scanning unit of the drive electrode driver according to a comparative example of the first embodiment.
Figure 9:
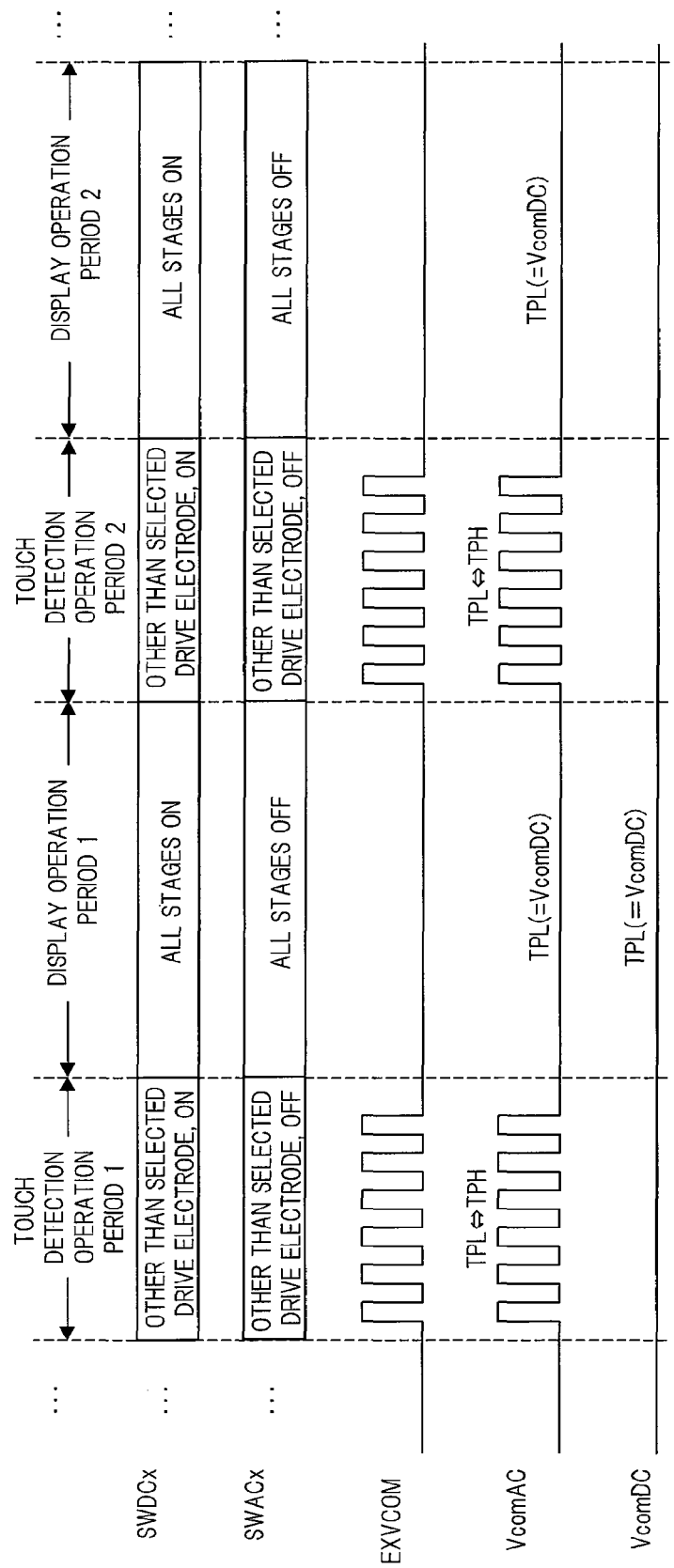
FIG. 9 is an explanatory diagram illustrating an example of the timing waveforms of the touch detection operation and the display operation in the operation of the display device with a touch detection function according to a comparative example of the first embodiment.

Here, in order to facilitate understanding of the characteristics of the display device with a touch detection function 1 according to the first embodiment, a display device with a touch detection function according to a comparative example of the first embodiment will be described with reference to FIGS. 8 and 9. FIG. 8 is a block diagram illustrating an example of the configuration of the drive signal generating unit 14Q and the drive electrode scanning units 14A and 14B of the drive electrode driver 14 according to the comparative example. FIG. 9 is an explanatory diagram illustrating an example of the timing waveforms of the touch detection operation and the display operation in the operation of the display device with a touch detection function according to the comparative example.

The drive signal generating unit 14Q and the drive electrode scanning units 14A and 14B of the drive electrode driver 14 illustrated in FIG. 8 correspond to those in FIG. 6 of the first embodiment described above, and the drive signal generating unit 14Q has the same configuration as that of FIG. 6. In addition, the drive electrode scanning units 14A and 14B have the same configuration as those of FIG. 6 except that the logic circuit of the drive section 53 is changed to a logical product circuit AND.

The timing waveforms of the touch detection operation and the display operation illustrated in FIG. 9 correspond to those in FIG. 7 of the first embodiment described above, and the timing waveforms of the touch detection operation are the same as those of FIG. 7. In addition, with respect to the timing waveforms of the display operation, the reverse operation is performed such that all of the switches SWACx connected to the wiring VCOMAC are turned off and all of the switches SWDCx connected to the wiring VCOMDC are turned on.

In the display device with a touch detection function according to the comparative example, the roles of the wiring VCOMDC and the wiring VCOMAC are as follows. During the touch detection operation period, like in the first embodiment, the wiring VCOMAC supplies the touch detection drive signal VcomAC, and the wiring VCOMDC fixes the non-selected drive electrodes to the potential of the display drive voltage VcomDC. During the display operation period, unlike in the first embodiment, the wiring VCOMAC is not used, and the wiring VCOMDC supplies the display drive voltage VcomDC.

Namely, since the wiring VCOMDC has two roles of supplying the display drive voltage (VcomDC) in the display operation period and fixing the potential of the non-selected drive electrodes in the touch detection operation period, it is necessary to lower the resistance thereof for display quality retention. For example, the wiring width needs to be 0.1 mm or more. Although it is not always necessary to widen the wiring VCOMDC that far solely for the potential fixing of the non-selected drive electrodes, the width of the wiring to be laid has to be increased because of the priority to the display quality. In addition, since the wiring VCOMAC has a role of supplying the touch detection drive signal VcomDC (TPL⇔TPH), the resistance reduction is required for fast driving. For example, the wiring width needs to be 0.1 mm or more.

As described above, in the display device with a touch detection function according to the comparative example, both the wirings of the wiring VCOMDC and the wiring VCOMAC need to be laid with large wiring width, and this has been a hindering factor against the shrinkage of left and right frames.

Therefore, in the display device with a touch detection function 1 according to the first embodiment, as described above, the wiring VCOMAC supplies the display drive voltage VcomDC and the wiring VCOMDC is not used in the display operation period. As a result, since the wiring VCOMDC is used only for fixing the non-selected drive electrodes and is not used for display, the wiring width can be greatly shrunk.

Effect of First Embodiment

According to the display device with a touch detection function 1 according to the first embodiment described above, since the role of the wiring VCOMDC can be limited only to the potential fixing of the non-selected drive electrodes during the touch detection operation period, it is possible to narrow the width of the wiring VCOMDC, and this can contribute to the reduction of frame area while achieving both of the fast touch drive and the display quality retention. In particular, in the structure in which the wirings VCOMDC are laid in the left and right frame regions Gd, a display device capable of contributing to the reduction of area of the left and right frames can be provided. The details are as follows.

(1) In the display operation period (first period), a plurality of drive electrodes COML can be connected to the first wiring VCOMAC. In addition, in the touch detection operation period (second period), the selected drive electrode of the plurality of drive electrodes COML can be connected to the first wiring VCOMAC, and the other non-selected drive electrodes of the plurality of drive electrodes COML can be connected to the second wiring VCOMDC.

(2) The second wiring VCOMDC can be disposed between the plurality of drive electrodes COML and the first wiring VCOMAC.

(3) The width of the second wiring VCOMDC can be made smaller than the width of the first wiring VCOMAC.

(4) In the display operation period, the DC voltage (TPL=VcomDC) can be supplied to the plurality of drive electrodes COML through the first wiring VCOMAC. In addition, in the touch detection operation period, the AC voltage (TPL⇔TPH) can be supplied to the selected drive electrode of the plurality of drive electrodes through the first wiring VCOMAC, and the DC voltage (TPL=VcomDC) can be supplied to the other non-selected drive electrodes of the plurality of drive electrodes through the second wiring VCOMDC.

(5) When attention is paid to the wiring VCOMAC (first signal line), the first switch SWAC3 and the second switch SWAC4, the first switch SWAC3 and the second switch SWAC4 can be put into the on state in the display operation period (first period). In addition, the first switch SWAC3 can be put into the on state and the second switch SWAC4 can be put into the off state in the touch detection operation period 1 (second period). In the next touch detection operation period 2 (third period), the first switch SWAC3 can be put into the off state and the second switch SWAC4 can be put into the on state. The same goes for the case where attention is paid to the other switches SWAC1 and SWAC2.

(6) When attention is paid to the wiring VCOMDC (second signal line), the third switch SWDC3 and the fourth switch SWDC4, the third switch SWDC3 can be put into the off state and the fourth switch SWDC4 can be put into the on state in the touch detection operation period 1. In the next touch detection operation period 2, the third switch SWDC3 can be put into the on state and the fourth switch SWDC4 can be put into the off state. The same goes for the case where attention is paid to the other switches SWDC1 and SWDC2.

(7) In the display operation period, the third switch SWDC3 and the fourth switch SWDC4 can be put into the off state. The same goes for the case where attention is paid to the other switches SWDC1 and SWDC2.

(8) The switches SWAC1 to SWAC4 including the first switch and the second switch and the switches SWDC1 to SWDC4 including the third switch and the fourth switch can be constituted of transistors. Each of the transistors can be put into the conduction state when each of the switches is in the on state, and each of the transistors can be put into the non-conduction state when each of the switches is in the off state.

(9) In the touch detection operation period, the drive signal VcomAC can be supplied to the drive electrode COML through the first wiring VCOMAC. In addition, in the display operation period, the drive voltage VcomDC can be supplied to the drive electrode COML through the first wiring VCOMAC.

(10) The drive signal VcomAC can be the AC drive signal whose amplitude periodically changes between the first voltage TPH having a voltage level higher than that of the ground voltage GND and the second voltage TPL having a voltage level lower than that of the ground voltage GND.

(11) In the touch detection operation period, the AC drive signal whose amplitude periodically changes between the first voltage TPH and the second voltage TPL can be supplied as the drive signal VcomAC to the drive electrode COML through the first wiring VCOMAC. In addition, in the display operation period, the DC drive voltage having a voltage level equal to that of the second voltage TPL can be supplied as the drive voltage to the drive electrode COML through the first wiring VCOMAC.

(12) In accordance with (1) to (11) described above, it is possible to provide the display device capable of contributing to the reduction of frame area while achieving both of the fast touch drive and the display quality retention.

Second Embodiment

The display device with a touch detection function according to the second embodiment will be described with reference to FIGS. 10 and 11. In the second embodiment, the difference from the first embodiment described above will be mainly described.

FIG. 10 is a block diagram illustrating an example of the configuration of the drive signal generating unit 14Q and the drive electrode scanning units 14A and 14B of the drive electrode driver 14 according to the second embodiment. FIG. 11 is an explanatory diagram illustrating an example of the timing waveforms of the touch detection operation and the display operation in the operation of the display device with a touch detection function according to the second embodiment. Note that the same components as those described in the first embodiment are denoted by the same reference characters and the repetitive descriptions thereof will be omitted.

As illustrated in FIG. 10, the drive signal generating unit 14Q of the drive electrode driver 14 according to the second embodiment includes a high-level voltage generating unit 61, a low-level voltage generating unit 62, buffers 63, 64 and 65, a logic circuit 67 and a switching circuit 68. In the drive signal generating unit 14Q, the drive control signal EXVCOM and the touch detection period identification signal TSHD are input from the control unit 11 to the logic circuit 67. The touch detection period identification signal TSHD is an identification signal indicating a high voltage value in the touch detection operation period for performing the touch detection operation and indicating a low voltage value in the display operation period for performing the display operation as illustrated in FIG. 11. The switching circuit 68 includes switches SW681 and SW683 which are turned on and off (switching operation) in accordance with the output of the logic circuit 67 and a switch SW682 which is turned on in accordance with the touch detection period identification signal TSHD.

The high-level voltage generating unit 61 generates a high-level voltage TPH of the drive signal VcomAC. The low-level voltage generating unit 62 generates a DC voltage of the display drive voltage VcomDC. The voltage TPH supplied from the high-level voltage generating unit 61 through the buffer 63 is supplied to one terminal of the switch SW681 of the switching circuit 68. A constant voltage, for example, a fixed voltage GND being the ground voltage is supplied to one terminal of the switch SW683 of the switching circuit 68. The voltage TPL supplied from the low-level voltage generating unit 62 through the buffer 64 is supplied to the switch SW682 of the switching circuit 68.

When the potential of the touch detection period identification signal TSHD is at a high level, the switch SW682 is turned off, and the output of the buffer 64 is not output to the wiring VCOMAC. Then, when the potential of the touch detection period identification signal TSHD is at a high level and the potential of the drive control signal EXVCOM is at a high level, the switch SW681 is turned on, the switch SW683 is turned off, and the output of the buffer 63 is output to the wiring VCOMAC as the high-level voltage TPH of the drive signal VcomAC. When the potential of the touch detection period identification signal TSHD is at a high level and the potential of the drive control signal EXVCOM is at a low level, the switch SW681 is turned off, the switch SW683 is turned on, and the fixed voltage GND is output to the wiring VCOMAC as the low-level voltage of the drive signal VcomAC. As a result, in the touch detection operation period, the switching circuit 68 alternately repeats the high-level voltage TPH generated by the high-level voltage generating unit 61 and the fixed voltage GND based on the drive control signal EXVCOM, thereby generating the drive signal VcomAC.

When the potential of the touch detection period identification signal TSHD is at a low level, the switch SW681 and the switch SW683 are both turned off, the switch SW682 is turned on, and the output of the low-level voltage TPL of the buffer 64 is output to the wiring VCOMAC as the display drive voltage. In this manner, in the display operation period, the low-level voltage TPL generated by the low-level voltage generating unit 62 is supplied to the wiring VCOMAC.

In the display device with a touch detection function 1 according to the second embodiment, the lower potential of the drive signal VcomAC supplied to the drive electrode COML in the touch detection operation period is the ground voltage GND. Thus, the drive signal generating unit 14Q can cause the rectangular wave of the drive signal VcomAC to fall without the intervention of the on-resistance of the buffer 64. As a result, the drive signal VcomAC can fall rapidly and the pulse width of the rectangular wave of the drive signal VcomAC cam be narrowed, so that the fast drive can be achieved. Further, the display device with a touch detection function 1 according to the second embodiment can reduce the power consumption. More specifically, the effects different from those of the first embodiment described above are as follows.

(1) In the touch detection operation period, the drive signal VcomAC supplied to the drive electrode COML can be an AC drive signal whose amplitude periodically changes between the ground voltage GND and the first voltage TPH having a voltage level higher than that of the ground voltage GND.

(2) In the touch detection operation period, an AC drive signal whose amplitude periodically changes between the ground voltage GND and the first voltage TPH can be supplied as the drive signal to the drive electrode COML through the first wiring VCOMAC. In addition, in the display operation period, a DC drive voltage of the second voltage TPL having a voltage level lower than that of the ground voltage GND can be supplied as the drive voltage to the drive electrode COML through the first wiring VCOMAC.

It should be understood that the person skilled in the art can conceive various types of modified examples and corrections in the category of the idea of the present invention, and these modified examples and corrections also belong to the scope of the present invention. For example, those obtained when the person skilled in the art appropriately modifies the embodiments above by addition, deletion or design change of components or by addition, omission, or condition change of steps are also included within the scope of the invention as long as they have the gist of the present invention.

In addition, it should be understood that other operational effects achieved by the aspects described in the present embodiment which are apparent from the description of the present specification or can be appropriately conceived by the person skilled in the art are, of course, derived from the present invention.

What is claimed:

1. A display device comprising:
   a plurality of pixel electrodes; and
   a plurality of drive electrodes for touch detection,
   wherein in a first period, a display function layer is controlled by a voltage between the plurality of pixel electrodes and the plurality of drive electrodes,
   in a second period, touch detection is performed by applying a voltage to one of the plurality of drive electrodes,
   in the first period, the plurality of drive electrodes are connected to a first wiring,
   in the second period, a part of the plurality of drive electrodes are connected to the first wiring, and another part of the plurality of chive electrodes are connected to a second wiring, the second wiring is disposed between the plurality of drive electrodes and the first wiring, and
   a width of the second wiring is smaller than a width of the first wiring.

2. The display device according to claim 1,
   wherein in the first period, a DC voltage is supplied to the plurality of drive electrodes through the first wiring, and
   in the second period, an AC voltage is supplied to the part of the plurality of drive electrodes through the first wiring, and a DC voltage is supplied to the another part of the plurality of drive electrodes through the second wiring.

3. A display device comprising:
   a first pixel electrode;
   a first drive electrode disposed opposite to the first pixel electrode;
   a second pixel electrode;
   a second drive electrode disposed opposite to the second pixel electrode;
   a display function layer disposed between the first pixel electrode and the first drive electrode and between the second pixel electrode and the second drive electrode;
   a first signal line;
   a first switch disposed between the first signal line and the first drive electrode;
   a second switch disposed between the first signal line and the second drive electrode;
   a second signal line;
   a third switch disposed between the second signal line and the first drive electrode; and
   a fourth switch disposed between the second signal line and the second drive electrode,
   wherein in a first period, the first switch and the second switch are turned into an on state,
   in a second period, the first switch is turned into an on state, and the second switch is turned into an off state, the third switch is turned into an off state, and the fourth switch is turned into an on state,
   in a third period, the first switch is turned into an off state, the second switch is turned into an on state, the third switch is turned into an on state, and the fourth switch is turned into an off state,
   the second signal line is disposed between the first drive electrode or the second drive electrode and the first signal line, and
   a width of the second signal line is smaller than a width of the first signal line.

4. The display device according to claim 3,
   wherein in the first period, the third switch and the fourth switch are turned into an off state.

5. The display device according to claim 4,
   wherein the first switch, the second switch, the third switch and the fourth switch are constituted of transistors, and each transistor is turned into a conduction state when each switch is in an on state and each transistor is turned into a non-conduction state when each switch is in an off state.

6. A display device which performs touch detection and display in a time division manner, the display device comprising:
   a drive electrode to which a drive signal for the touch detection and a drive voltage for the display are supplied in the time division manner,
   wherein in a period of the touch detection, the drive signal is supplied to the drive electrode through a first wiring,
   in a period of the display, the drive voltage is supplied to the drive electrode through the first wiring,
   a second wiring is disposed between the drive electrode and the first wiring, and a width of the second wiring is smaller than a width of the first wiring.

7. The display device according to claim 6,
wherein the drive signal is an AC drive signal whose amplitude periodically changes between a first voltage having a voltage level higher than a ground voltage and a second voltage having a voltage level lower than the ground voltage.

8. The display device according to claim 7,
wherein in the period of the touch detection, the AC drive signal whose amplitude periodically changes between the first voltage and the second voltage is supplied as the drive signal to the drive electrode through the first wiring, and in the period of the display, a DC drive voltage having a voltage level equal to the second voltage is supplied as the drive voltage to the drive electrode through the first wiring.

9. The display device according to claim 6,
wherein the drive signal is an AC drive signal whose amplitude periodically changes between a ground voltage and a first voltage having a voltage level higher than the ground voltage.

10. The display device according to claim 9,
wherein in the period of the touch detection, the AC drive signal whose amplitude periodically changes between the ground voltage and the first voltage is supplied as the drive signal to the drive electrode through the first wiring, and in the period of the display, a DC drive voltage of a second voltage having a voltage level lower than the ground voltage is supplied as the drive voltage to the drive electrode through the first wiring.

\* \* \* \* \*